(12) United States Patent
Liu

(10) Patent No.: US 8,005,975 B2
(45) Date of Patent: Aug. 23, 2011

(54) REDUCING OR MINIMIZING DELAYS IN PEER-TO-PEER COMMUNICATIONS SUCH AS PEER-TO-PEER VIDEO STREAMING

(75) Inventor: Yong Liu, Secaucus, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 0 days.

(21) Appl. No.: 12/898,762

(22) Filed: Oct. 6, 2010

(65) Prior Publication Data

US 2011/0022660 A1   Jan. 27, 2011

Related U.S. Application Data

(62) Division of application No. 12/235,310, filed on Sep. 22, 2008.

(60) Provisional application No. 60/994,857, filed on Sep. 21, 2007.

(51) Int. Cl.
*G06F 15/16* (2006.01)

(52) U.S. Cl. ........................................ 709/231; 709/232

(58) Field of Classification Search .................. 709/231, 709/232
See application file for complete search history.

(56) References Cited

U.S. PATENT DOCUMENTS

| | | | |
|---|---|---|---|
| 7,587,509 B1 * | 9/2009 | Edelman et al. | 709/231 |
| 2008/0133767 A1 * | 6/2008 | Birrer et al. | 709/231 |
| 2009/0019174 A1 * | 1/2009 | Ehn et al. | 709/231 |
| 2009/0083433 A1 * | 3/2009 | Liu | 709/231 |
| 2009/0300673 A1 * | 12/2009 | Bachet et al. | 725/31 |
| 2009/0327510 A1 * | 12/2009 | Edelman et al. | 709/231 |
| 2010/0030909 A1 * | 2/2010 | Magharei et al. | 709/231 |
| 2010/0042668 A1 * | 2/2010 | Liang et al. | 709/201 |
| 2010/0138511 A1 * | 6/2010 | Guo et al. | 709/207 |
| 2010/0146138 A1 * | 6/2010 | Ng et al. | 709/231 |
| 2010/0185753 A1 * | 7/2010 | Liu et al. | 709/219 |

* cited by examiner

*Primary Examiner* — Krisna Lim
(74) *Attorney, Agent, or Firm* — John C. Pokotylo; Straub & Pokotylo (57) ABSTRACT

A new P2P streaming method and apparatus disseminates video chunks to all peers with the minimum (or at least reduced) delay. After obtaining a new video chunk, a peer keeps transmitting (uploading) that video chunk to other peers until all peers receive it. The approach quickly increases the aggregate bandwidth that can be utilized to transmit a video chunk. For example, the aggregate peer bandwidth used to transmit a video chunk can double every time slot. For a homogeneous P2P streaming system with N peers, a time slot is defined as a unit of the single chunk transmission delay between two peers. Using the P2P streaming method, a video chunk can be disseminated to all peers within $1+\log_2 N$ time slots.

19 Claims, 8 Drawing Sheets

REDUCING OR MINIMIZING DELAYS IN PEER-TO-PEER COMMUNICATIONS SUCH AS PEER-TO-PEER VIDEO STREAMING

RELATED APPLICATIONS

This application is a divisional of U.S. patent application Ser. No. 12/235,310 (referred to as "the '310 application" and incorporated herein by references), titled "REDUCING OR MINIMIZING DELAYS IN PEER-TO-PEER COMMUNICATIONS SUCH AS PEER TO PEER VIDEO STREAMING," filed on Sep. 22, 2008, listing Yong LIU as the inventor, which claims benefit, under 35 U.S.C. §119(e)(1), to the filing date of provisional patent application Ser. No. 60/994,857 (referred to as "the '857 provisional" and incorporated herein by reference), entitled "PEER TO PEER VIDEO STREAMING TECHNIQUE FOR REDUCING OR MINIMIZING DELAYS", filed on Sep. 21, 2007 and listing Yong LIU as the inventor, for any inventions disclosed in the manner provided by 35 U.S.C. §112, ¶ 1.

FEDERAL FUNDING

This invention was made with Government support and the Government may have certain rights in the invention as provided for by grant number CNS-0519998 by the National Science Foundation.

§1. BACKGROUND OF THE INVENTION

§1.1. Field of the Invention

The present invention concerns peer-to-peer ("P2P") communications. In particular, the present invention concerns reducing or minimizing delays in P2P communications, such as P2P video streaming.

§1.2. Background Information

IP-level multicast has not been widely deployed in the Internet. Recently, multicast functionality has been implemented at the application layer. (See, e.g., the paper Chu, Y., Rao, S., and Zhang, H., "A Case for End System Multicast," *Proceedings of ACM SIGMETRICS* (2000); and the paper Francis, P. Yoid, "Extending the Internet Multicast Architecture," *Tech. rep.*, Cornell University, April 2000 available at http://www.cs.cornell.edu/people/francis/yoidArch.pdf.) For example, users interested in the same video program may form an application layer overlay network for P2P video streaming.

P2P video streaming systems are generally categorized as tree-based and mesh-based. In a tree-based P2P video streaming system, peers form an application layer multicast tree. Video data flows from a source server to a peer through multiple hops in the tree. The video delay perceived by a peer includes video transmission delays and propagation delays on all hops. The fan out degree of a peer in the tree is determined by the number of simultaneous video streams that can be supported by a peer's uploading capacity. An example of a tree-based P2P video streaming system is Overcast. (See, e.g., the article Jannotti, J., Gifford, D. K., Johnson, K. L., Kaashoek, M. F., AND O'Toole, JR., J. W., "Overcast: Reliable Multicasting with an Overlay Network," Proceedings of Operating Systems Design and Implementation, pp. 197-212 (2000).)

Unfortunately, present tree-based P2P video streaming systems have some problems. More specifically, since a typical peer can only upload a small number of concurrent video streams, the multicast tree formed by peers tends to have a narrow width, and consequently, a large depth. Unfortunately, with such a large depth multicast tree, peers at low layers of the multicast tree can experience excessive delays between the time of video request to the receipt of the video stream. For cases in which each peer has only enough capacity to upload one stream to one other peer, the multicast tree topology formed by N peers becomes a chain with N hops. In this worst case scenario, the multicast tree is a chain (has a width of one and a depth of N), and the delay for the peer at the end of the chain is the aggregate video chunk transmission and propagation delays along the N hops.

To address the foregoing problem, multi-tree based P2P video streaming approaches have been proposed. (See, e.g., the papers: Castro, M., Druschel, P., Kermarrec, A.-M., Nandi, A., Rowstron, A., and Singh, A., "SplitStream: High-bandwidth Multicast in Cooperative Environments," *Proceedings of ACM Symposium on Operating Systems Principles (SOSP)* (2003); and Kostic, D., Rodriguez, A., Albrecht, J., and Vahdat, A., "Bullet: High Bandwidth Data Dissemination using an Overlay Mesh," *Proceedings of ACM Symposium on Operating Systems Principles (SOSP)* (2003).) In multi-tree streaming, the server divides the stream into m sub-streams. Instead of one streaming tree, m sub-trees are formed—one for each sub-stream. When a fully balanced multi-tree is used for streaming, the node degree of each sub-tree is m. Each peer joins all sub-trees to retrieve sub-streams. Any peer is positioned on an internal node in only one sub-tree and only uploads one sub-stream to its m children peers in that sub-tree. In each of the remaining (m−1) sub-trees, the peer is positioned on a leaf node and downloads a sub-stream from its parent peer. It has been shown that if all peers have the same uploading capacity and the propagation delays among peers are dominated by video chunk transmission delays, the average and worst-case delays for peers in a m-degree multi-tree streaming systems are m $\log_m$ N times the video chunk transmission delay from one peer to another peer. The shortest streaming delay is achieved when the degree m=3, and shortest achievable delay is 1.89 $\log_2$ N times the chunk transmission delay.

Many recent P2P streaming systems adopt mesh-based streaming approach. (See, e.g., the articles: Zhang, X., Liu, J., Li, B., And Yum, T-S. P., "DONet/CoolStreaming: A Data-Driven Overlay Network for Peer-to-Peer Live Media Streaming," *Proceedings of IEEE INFOCOM* (March 2005); Pai, V., Kumar, K., Tamilmani, K., Sambamurthy, V., And Mohr, A., "Chainsaw: Eliminating Trees from Overlay Multicast," *The Fourth International Workshop on Peer-to-Peer Systems* (2005); Zhang, M., Zhao, L., Tang, J. L. Y., And Yang, S., "A Peer-to-Peer Network for streaming Multicast through the Internet," *Proceedings of ACM Multimedia* (2005); and Magharei, N., And Rejaie, R., "Prime: Peer-to-Peer Receiver-Driven Mesh-Based Streaming," *Proceedings of IEEE INFOCOM* (2007).) In some of these mesh-based systems, there is no static streaming topology. Rather, peers establish and terminate peering relationships dynamically. Further, a peer may download video from and/or upload video to multiple peers simultaneously. Unfortunately, the video data flows among peers are largely uncoordinated. Consequently, the delay performance of existing mesh-based streaming systems is unsatisfactory.

In view of the foregoing limitations of existing P2P video streaming techniques, it would be useful to have improved P2P video streaming methods and systems. For example, it would be useful to have P2P video streaming methods and systems in which peers experience lower streaming delays.

§2. SUMMARY OF THE INVENTION

At least some embodiments consistent with the present invention provide P2P streaming which disseminates video chunks to all peers with the minimum (or at least reduced) delay. After obtaining a new video chunk, a peer keeps transmitting (uploading) that video chunk to other peers until all peers receive it. The aggregate bandwidth that can be utilized to transmit a video chunk increases quickly. For example, the aggregate peer bandwidth used to transmit a video chunk can double every time slot. For a homogeneous P2P streaming system with N peers, a time slot is defined as a unit of the single chunk transmission delay between two peers. Using the P2P streaming method, a video chunk can be disseminated to all peers within $1+\log_2 N$ time slots.

§4. DETAILED DESCRIPTION

An exemplary environment in which embodiments consistent with the present invention may be used is introduced in §4.1. Then, exemplary methods and schedulers for performing operations consistent with the present invention are described in §4.2. Next, exemplary apparatus for performing various operations and generating and/or storing various information in a manner consistent with the present invention are described in §4.3. Refinements, alternatives and extensions are described in §4.4. Finally, some conclusions about such exemplary embodiments are provided in §4.5.

Figure 1:
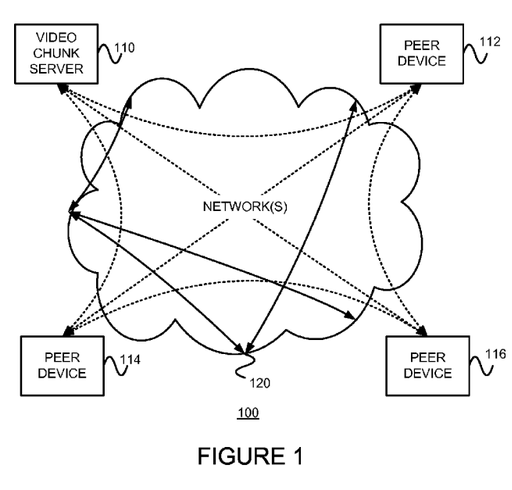
FIG. 1 illustrates an environment 100 in which embodiments consistent with the present invention may be used.

§4.1 Exemplary Environment in which Embodiments Consistent with the Present Invention May be Used FIG. 1 illustrates an environment 100 in which embodiments consistent with the present invention may be used. Video chunk server 110 and peer devices 112, 114 and 116 can communicate with one another via one or more network(s) 120 such as the Internet for example. As indicated by the dashed lines, the video chunk server and each of the peers may establish a communications session with the others thereby establishing a full-mesh topology. Mesh-based systems have a lower delay bound than that which can be achieved by the optimal tree-based systems. The video chunk server 110 may (1) encode and stream video information (or simply stream previously encoded video information). The video chunk server 110 may include any device that may perform the foregoing function(s), such as a server computer for example. Thus, the video chunk server may be a computer, for example. The peer devices may (1) transmit (upload) streamed video data, (2) decode (and play) video information, or (3) both. Peer devices may include any device that may perform one or both of the foregoing functions. Thus, peer devices may include server computers, desktop computers, laptop computers, smart phones, personal digital assistants ("PDAs"), video players, set-top boxes, etc.

§4.2 Exemplary Embodiments Consistent with the Present Invention

§4.2.1 Snowball P2P Video Streaming

A new P2P streaming method for disseminating video chunks to all peers with the minimum delay is now described. After obtaining a new video chunk, a peer keeps transmitting (uploading) that video chunk to other peers until all peers receive it. The accumulation of the aggregate upload bandwidth for the chunk mimics the formation of a snowball. This snowball approach quickly increases the aggregate bandwidth that can be utilized to transmit a video chunk. For example, the aggregate peer bandwidth used to transmit a video chunk can double every time slot. For a homogeneous P2P streaming system with N peers, a time slot is defined as a unit of the single chunk transmission delay between two peers. Using the P2P streaming method, a video chunk can be disseminated to all peers within $1+\log_2 N$ time slots. The '857 provisional demonstrated that this video chunk dissemination approach is indeed the fastest P2P chunk dissemination approach.

Figure 2:
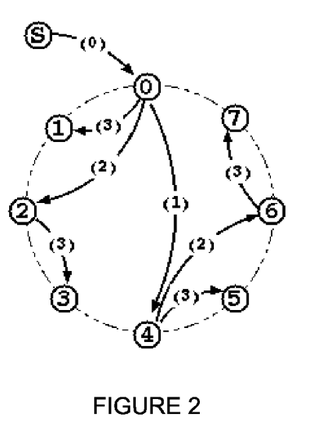
FIG. 2 illustrates an example of data flow using a video chunk dissemination method, consistent with the present invention, for eight peers.
Figure 3A:
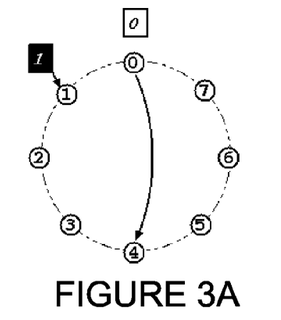
FIGS. 3A-3F illustrate an example of video chunk streaming, in a manner consistent with the present invention, in a system with eight peers.
Figure 3B:
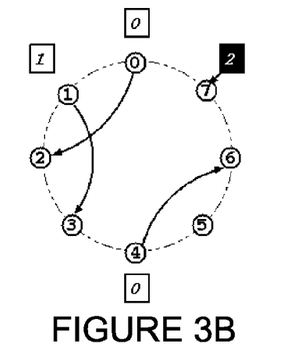
Figure 3C:
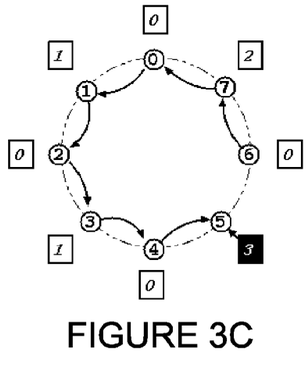
Figure 3D:
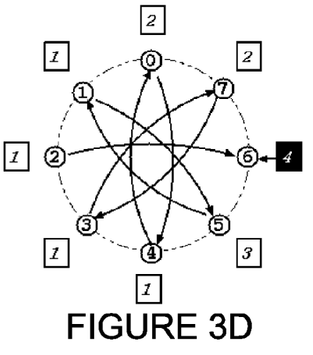
Figure 3E:
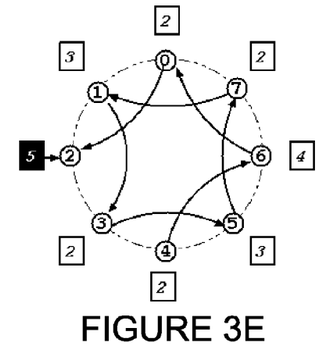
Figure 3F:
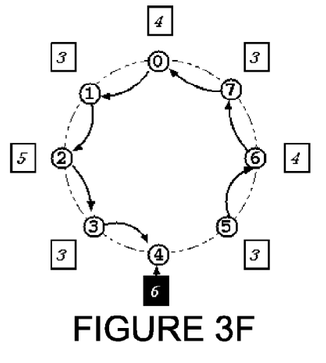

FIG. 2 illustrates an example of data flow using a snowball video chunk dissemination method, consistent with the present invention, for eight peers. An arc from node i to node j with a label k represents that peer i (or the server) transmits (uploads) the video chunk to peer j in time slot k. It takes four time slots for all peers to receive the video chunk (1 peer at the first time slot, 2 peers at the second time slot, 4 peers at the third time slot, and 8 peers at the fourth time slot).

In continuous video streaming, there are multiple video chunks in transition at any given time. They compete for the upload bandwidth available on all peers. The allocation of peer upload bandwidth to active video chunks determines their delays, which in turn determines user-perceived streaming delay performance. To illustrate, consider the case when $N=2^k$. The minimum video chunk delay in this case is $k+1$. At the beginning of some time slot j, there are $2^{j-i-1}$ peers having video chunk i, $j-k \leq i < j$. Let $\Psi(j)$ denote the set of $2^{k-1}=N/2$ peers with video chunk (j−k). Within time slot j, peers in $\Psi(j)$ will upload video chunk j−k to N/2 peers that don't currently have the video chunk and finish the dissemination of video chunk j−k. Peers in set $\Psi(j)$ can be utilized to upload other newer video chunks in time slot j+1. To make it happen, in time slot j, a peer who has a video chunk with ID $j-k<l<j$ will upload its video chunk to some peer in set $\Psi(j)$. In addition, different peers should upload to different peers in $\Psi(j)$. This makes the number of peers with video chunk l, j−k<l<j, double at the beginning of time slot j+1 to $2^{j-1}$.

At the same time, a new video chunk with ID j has been generated by the video source server at the beginning of time slot j. The server will upload video chunk j to a peer in Ψ(j) who doesn't have any video chunk with ID l, j−k<l<j. The scheduling method repeats in the subsequent time slots until the complete stream is disseminated to all N peers. In this way, the upload capacity for each video chunk doubles every time slot and all video chunks can be disseminated to all peers within the minimum delay $1+\log_2 N$.

FIGS. 3A-3F illustrate an example of video chunk streaming, in a manner consistent with the present invention, in a system with eight peers. FIGS. 3A-3F illustrate video chunk transmission (upload) schedules among all peers in six consecutive time slots. Blocks represent video chunks and circles represent peers. For a given time slot k, a white video chunk beside a peer is the chunk that the peer has and will be uploaded to another peer within that time slot. An arc from peer i to j indicates that peer i uploads its chunk to peer j. A black video chunk beside a peer indicates the server will inject that video chunk to the peer in time slot k. Video chunk 0 is uploaded to all peers by the end of time slot 3 and video chunk 1 is uploaded to all peers by the end of time slot 4. The example shows that any video chunk can be disseminated to all peers four time slots after it is generated by the server.

§4.2.1.1 Hierarchical Snowball P2P Video Streaming

At least some embodiments consistent with the present invention modify the snowball P2P video streaming method to account for a P2P network with peers having different upload capacities (or upload capacities made available or offered). In such embodiments, peers are classified into a hierarchy according to their uploading capacities. Peers at the same layer of the hierarchy have roughly the same uploading capacity, with peers at higher layers have higher capacities. Under the modified hierarchical scheduling method, video chunks are sent to peers with a higher capacity (that is, those classified at a higher level of the hierarchy) first. Video chunks are then disseminated, from the top of the hierarchy to the bottom of the hierarchy, via peers at any intermediate levels of the hierarchy, to all peers.

More specifically, the server only uploads video chunks to peers at layer 1 (the highest layer) of the hierarchy. Peers at layer 1 collaboratively execute the snowball P2P video streaming method to quickly disseminate the video chunks among themselves. In addition, each peer at layer 1 also acts as a "proxy" video server for a set of peers at layer 2 of the hierarchy, and uploads chunks to them whenever it has spare upload capacity. Peers at layer 2 of the hierarchy (e.g., sharing the same video server proxy from layer 1 of the hierarchy) again execute the snowball P2P video streaming among themselves and act as video proxies for peers at layer 3 of the hierarchy, so on and so forth. The streaming process continues until all peers at the bottom layer receive the chunks.

Table 1 illustrates a video chunk transmission (uploading) schedule for a system with eight super-peers (that is, peers classified at a higher (in this case, top) level of the hierarchy) and eight free-riders (that is, peers classified at the next (in the case, bottom) level of the hierarchy). The sixteen peers are classified into one of two levels in a two-level hierarchy. Super-peers, each having an available uploading capacity of 2, form the top level of the two-level hierarchy. The super-peers are indexed from 0 to 7. Free-riders form the bottom level of the two level hierarchy. The free-riders are labeled from a to h.

In the table, a tuple (x,y) at row i, column j means super peer i will upload video chunk x to peer y in time slot j. A video chunk is uploaded to all super peers first. Then it will be uploaded to all free-riders within one additional round (e.g., one additional half time slot). The overall chunk dissemination delay is 3.5 time slots.

TABLE 1

| SP_ID | 1 | 1.5 | 2 | 2.5 | 3 | 3.5 | 4 | 4.5 | 5 |
|---|---|---|---|---|---|---|---|---|---|
| 0 | 0, 1 | 0, 2 | 0, 4 | 0, a | 2, 1 | 2, 2 | 2, 4 | 2, a | 4, 1 |
| 1 | | 0, 3 | 0, 5 | 0, b | | 2, 3 | 2, 5 | 2, b | |
| 2 | | | 0, 6 | 0, c | 0, g | 1, a | 2, 6 | 2, c | 2, g |
| 3 | | | 0, 7 | 0, d | 0, h | 1, b | 2, 7 | 2, d | 2, h |
| 4 | | | | 0, e | 1, 0 | 1, c | 1, g | 2, e | 3, 0 |
| 5 | | | | 0, f | 1, 1 | 1, d | 1, h | 2, f | 3, 1 |
| 6 | | | | 1, 4 | 1, 2 | 1, e | | 3, 4 | 3, 2 |
| 7 | | | 1, 6 | 1, 5 | 1, 3 | 1, f | 3, 6 | 3, 5 | 3, 3 |

§4.2.1.2 Dynamic Snowball P2P Video Streaming—Centralized Scheduling

The previously described P2P video streaming methods perform best when employed in a "static" network environment—that is, a network environment in which peers are stable, their upload bandwidth is fixed and the delay between peers is negligible relative to video chunk transmission delays. In a more general network environment, peers may join and leave, the bandwidth on peering connections may fluctuate, and propagation delays between peers may be random and can become comparable with chunk transmission delays. Thus, for many practical network environments, video chunk uploading schedules should be calculated dynamically to account for, and adapt to, network bandwidth and delay variations.

Figure 4:
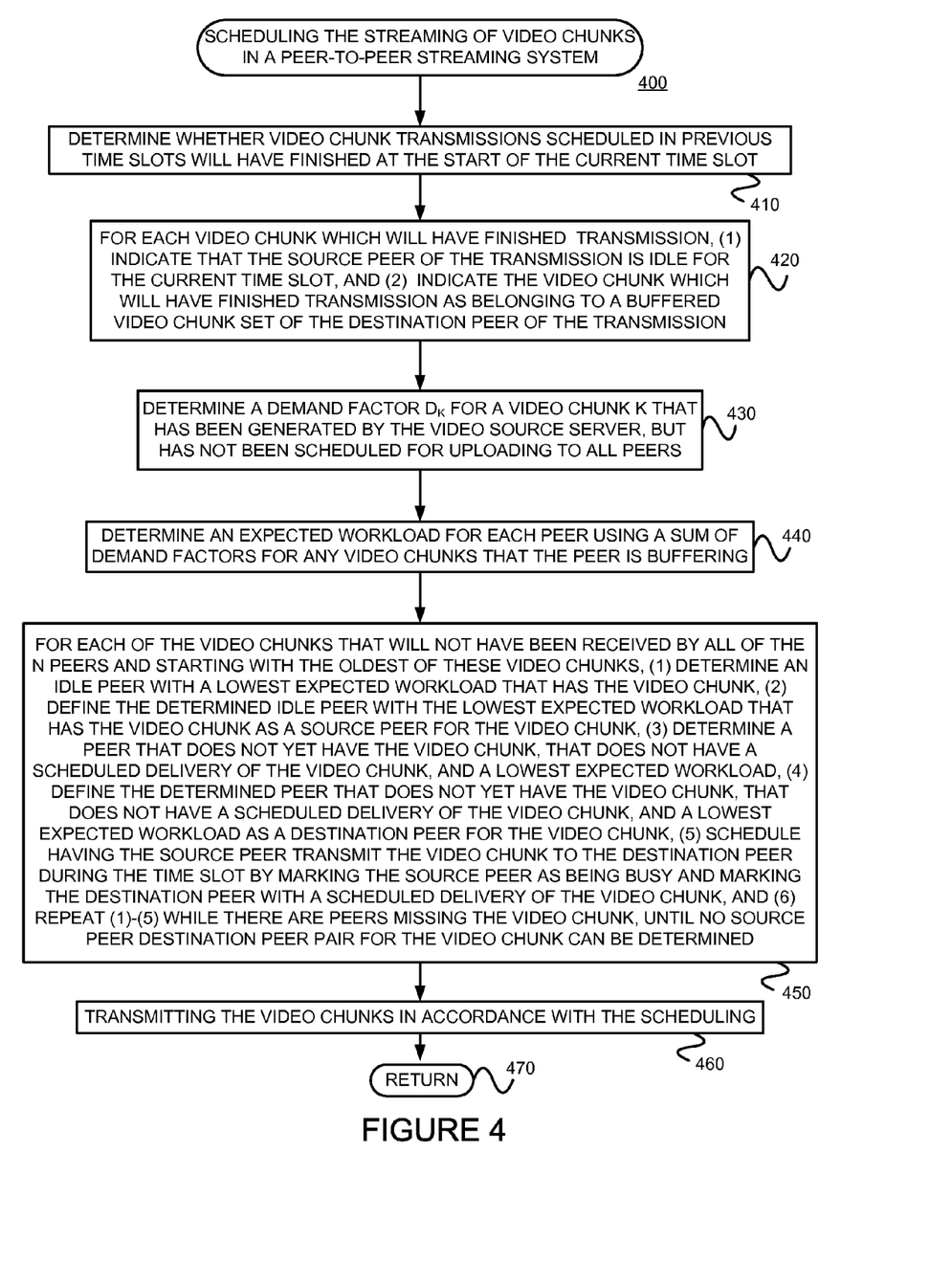
FIG. 4 is a flow diagram of an exemplary method for scheduling (for each time slot) the streaming of video chunks in a P2P streaming system, in a manner consistent with the present invention.

FIG. 4 is a flow diagram of an exemplary method 400 for scheduling (for each time slot) the streaming of video chunks in a P2P streaming system, in a manner consistent with the present invention. Whether video chunk transmissions scheduled in previous time slots will have finished at the start of the current time slot is determined. (Block 410) For each video chunk which will have finished transmission, the source peer of the transmission is indicated as being idle for the current time slot, and the video chunk which will have finished transmission is indicated as belonging to a buffered video chunk set of the destination peer of the transmission. (Block 420) A demand factor $d_k$ for a video chunk k that has been generated by the video source server, but has not been scheduled for uploading to all peers, is determined. (Block 430) Demand factor $d_k$ is proportional to a number of the N peers which will be without the video chunk k, and is inversely proportional to a number of the N peers which will have the video chunk. An expected workload for each peer (to upload video chunk(s) to peer(s) without them) is determined using a sum of demand factors for any video chunks that the peer is buffering. (Block 440) Then, for each of the video chunks that will not have been received by all of the N peers, starting with the oldest of these video chunks, (1) an idle peer with a lowest expected workload that has the video chunk is determined and defined as a "source" peer for the video chunk, (2) a peer that does not yet have the video chunk, that does not have a scheduled delivery of the video chunk, and a lowest expected workload is determined and defined as a "destination" peer for the video chunk, and (3) the source peer is scheduled to transmit the video chunk to the destination peer during the time slot by marking the source peer as being busy and marking the destination peer with a scheduled delivery of the video chunk, and these three acts are repeated while there are peers missing (and not scheduled to receive) the video chunk, until no source peer destination peer pair for the video chunk can be determined. (Block 450)

After at least a round of scheduling, the video chunks are transmitted in accordance with the schedule (Block 460) before the method 400 is left (Node 470). The method 400 may be repeated until each of the peers is scheduled to receive each of the video chunks of the video stream.

Referring back to block 430, in at least some embodiments consistent with the present invention, the demand factor $d_k$ is a ratio of the number of peers without video chunk k to the number of peers with video chunk k.

Referring back to block 440, in at least some embodiments consistent with the present invention, the total expected workload for peer i is $$W_i = \sum_{k \in B_i} d_k,$$

where $d_k$ is the demand factor i and wherein B is a set of video chunks buffered by the peer that have not yet been sent to all of the N peers.

Referring back to block 460, in at least some embodiments consistent with the present invention, (appropriate parts of) the scheduling information may be signaled to (appropriate ones of) the peers.

Thus, in at least some embodiments consistent with the present invention, scheduling works in rounds. At each round, let A be the set of video chunks that have been generated by the video source server, but have not been uploaded to all peers. For any video chunk k∈A, let $R_k$ be the number of peers with video chunk k, $N_k$ be the number of peers without video chunk k. The demand factor for video chunk k is defined as $d_k = N_k/R_k$, which is the expected workload for each peer with video chunk k to upload it to some peers without it. For any peer i, let $B_i \subseteq A$ be the set of video chunks in its buffer. The total expected workload for peer i can be calculated as $$W_i = \sum_{k \in B_i} d_k.$$

The P2P uploading schedule in a round may be determined as follows:
1. Check whether video chunk transmissions scheduled in previous rounds have finished at the beginning of this round. For each completed video chunk transmission, mark the source peer of the transmission idle, add the transmitted video chunk to the buffered chunk set of the destination peer of the transmission.
2. Update $R_k$ and $N_k$, k∈A and the expected workload $W_i$ for all peers.
3. Starting with the oldest video chunk j in A, find an idle peer ("source") with the lowest expected workload that has chunk j; then find a peer ("destination") with the lowest expected workload that does not yet have video chunk j, nor have a scheduled delivery of video chunk j. Let "source" peer use all its bandwidth to upload video chunk j to "destination" peer starting from this round. Mark "source" peer busy, mark "destination" peer with a scheduled delivery of video chunk j.
4. If there are still peers missing chunk j, go back to (3) until no "source-destination" peer pair for video chunk j can be found.
5. Set j to be the next oldest chunk in A, go back to (3) until all video chunks in A have been tested, then end scheduling in the round.

As discussed in the '857 provisional, simulations have shown that when there are no bandwidth variations and the propagation delays are negligible, the dynamic snowball streaming method achieves the minimum single-chunk delay bound. When peer upload bandwidth is random and the average equals the streaming rate, the delay is much longer than the corresponding average single-chunk delay bound. However, if the average peer upload bandwidth is increased to 1.25 times the streaming rate, the delay performance is very close to the minimum delay bound. When the propagation delays are non-negligible and are randomly distributed according to normal distribution with mean equals the single chunk transmission time, and when each peer's upload bandwidth equals the streaming rate (resource index=1), the delay performance is worse than the single-chunk delay bound. When the resource index is increased to 1.25 and 1.5 respectively, the delay performance is improved greatly and converges to the minimum delay bound. When both peer upload bandwidth and the propagation delays are random, and when the resource index equals 1, the chunk delivery time is much longer than the single-chunk delay bound. Increasing the system resource index to 1.25 and 1.5 can largely improve the delay performance and achieve the minimum delay bound. Thus, with a little bit extra peer uploading bandwidth, the dynamic snowball streaming method can approach the minimum delay bounds in the face of random variations in peer uploading bandwidth and propagation delays on peering connections.

Figure 5:
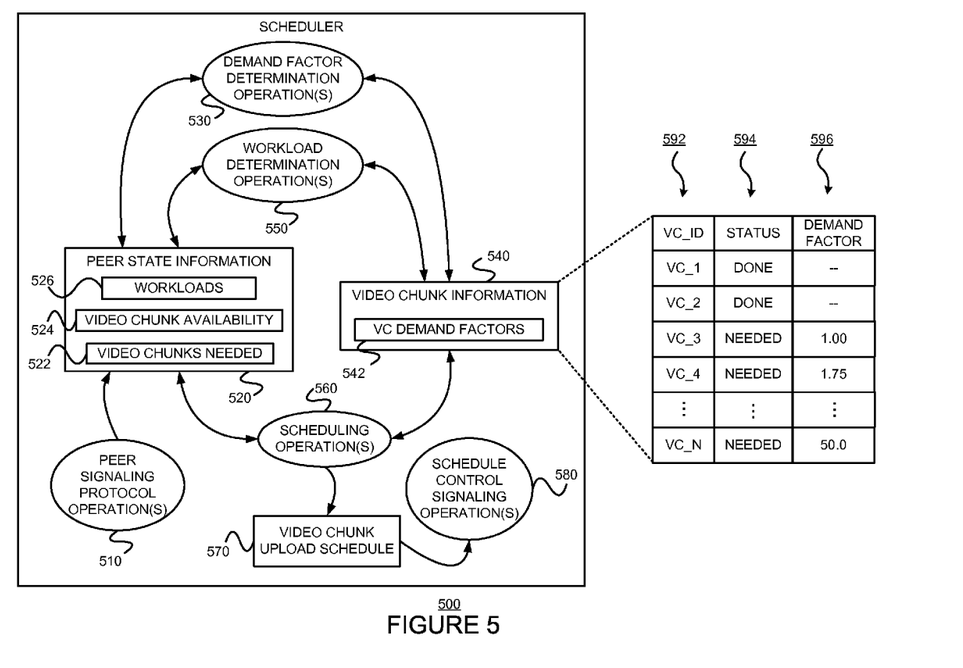
FIG. 5 is a bubble diagram showing operations that may be performed, and information that may be used and/or generated, by an exemplary centralized video chunk transmission (upload) scheduler consistent with the present invention.

FIG. 5 is a bubble diagram showing operations that may be performed, and information that may be used and/or generated, by an exemplary centralized scheduler 500 consistent with the present invention. The scheduler 500 includes peer signaling protocol operation(s) 510, peer state information 520, demand factor determination operation(s) 530, video chunk information 540, workload determination operation(s) 550, scheduling operation(s) 560, video chunk upload schedule 570 and schedule protocol signaling operation(s) 580. Peer signaling protocol operation(s) 510 may be used to gather (and perhaps disseminate) peer state information, some of which is stored as peer state information 520, such as video chunks needed by various peers 522 and video chunks available for transmission by various peers 524. Demand factor determination operation(s) 530 may use video chunk information 540 and peer state information 520 to determine demand factors for video chunk, which may be stored as video chunk demand factor information 542. Workload determination operation(s) 550 may use peer state information 520 (and perhaps video chunk information) to determine workloads 526 of the peers. Scheduling operations 560 may use both video chunk information (e.g., to find the video chunk(s) with the highest demand factor(s)) and the workload information 526 (e.g., to find the peer having such video chunks, but with available upload capacity) to generate a video chunk upload schedule 570. Finally, schedule protocol signaling operation(s) 580 may signal the video chunk upload schedule to the peers (e.g., as necessary).

§4.2.1.3 Dynamic Snowball P2P Video Streaming—Distributed Scheduling

The centralized dynamic snowball streaming method requires global knowledge of the chunk availabilities and the expected workloads on peers. The transmissions (uploads) for video chunks from all peers are coordinated by the centralized scheduling algorithm. On the other hand, in a distributed P2P streaming system, each peer only communicates with (e.g., for purposes of exchanging state information and for purposes of video chunk transmissions) a subset of peers (e.g., neighboring peers, or peers within N hops of the peer).

Figure 6:
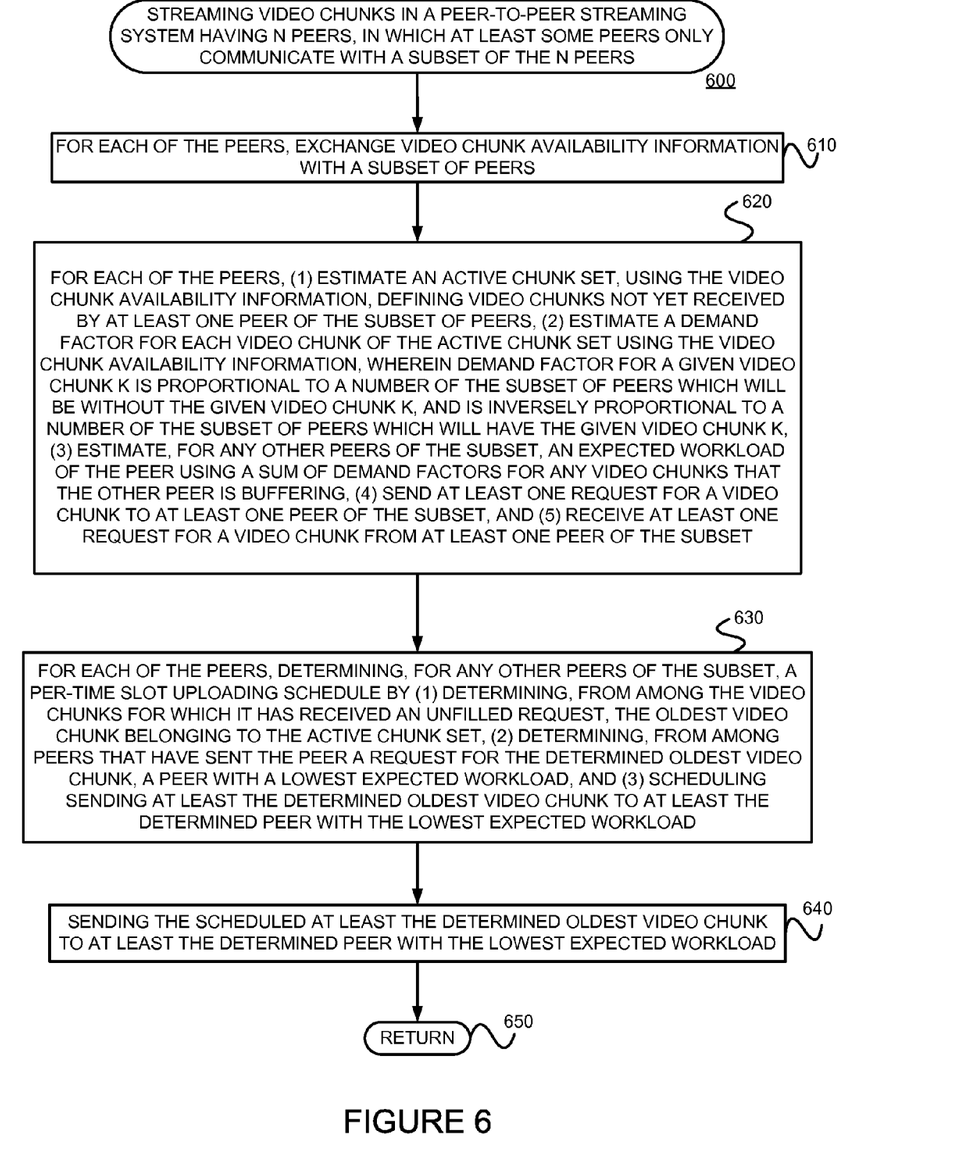
FIG. 6 is a flow diagram of an exemplary method for streaming video chunks in a peer-to-peer streaming system having N peers, in which at least some peers only communicate with a subset of the N peers (e.g., neighboring peers).

FIG. 6 is a flow diagram of an exemplary method 600 for streaming video chunks in a P2P streaming system having N peers, in which at least some peers only communicate with a subset of the N peers (e.g., neighboring peers, or peers within N hops of the peer). For each of the peers, video chunk availability information is exchanged with the subset of peers. (Block 610) Thus, a peer will discover state information about a subset of peers. Each of the peers may then (1) estimate an active chunk set, using the video chunk availability information, defining video chunks not yet received by at least one peer of the subset of peers, (2) estimate a demand factor for each video chunk of the active chunk set using the video chunk availability information (where the demand factor for a given video chunk K is proportional to a number of the subset of peers which will be without the given video chunk K, and is inversely proportional to a number of the subset of peers which will have the given video chunk K), (3) estimate, for any other peers of the subset, an expected workload of the peer using a sum of demand factors for any video chunks that the other peer is buffering, (4) send at least one request for a video chunk to at least one peer of the subset, and (5) receive at least one request for a video chunk from at least one peer of the subset. (Block 620) For each of the peers, a per-time slot uploading schedule for any other peers of the subset is determined by (1) determining, from among the video chunks for which it has received an unfilled request, the oldest video chunk belonging to the active chunk set, (2) determining, from among peers that have sent the peer a request for the determined oldest video chunk, a peer with a lowest expected workload, and (3) scheduling sending at least the determined oldest video chunk to at least the determined peer with the lowest expected workload. (Block 630) The scheduled (oldest) video chunk (and perhaps additional video chunk(s)) is then transmitted to at least the determined peer with the lowest expected workload (Block 640) before the method 600 is left (Node 650).

Referring back to block 630, in at least some embodiments consistent with the present invention, the act of determining, for any other peers of the subset, a per-time slot uploading schedule includes determining a number (C) of video chunks that the peer can transmit in one time slot, determining, from among the video chunks for which it has received an unfilled request, the oldest video chunk belonging to the active chunk set, and determining a number (X) of peers that have sent the peer a request for the determined oldest video chunk. If the determined number (X) of peers that have sent the peer a request for the determined oldest video chunk is greater than the determined number (C) of video chunks that the peer can transmit in one time slot, then, a number (C) of peers with a lowest expected workload, from among peers that have sent the peer a request for the determined oldest video chunk, is determined and the determined oldest video chunk is sent to the determined number (C) of peers with the lowest expected workload.

Otherwise, the determined oldest video chunk is sent to all of the peers that have sent the peer a request for the determined oldest video chunk. If X<C at least one other video chunk to at least one other peer using the age of the video chunk and the workloads of the peers of the subset. Otherwise, no further video chunks are sent in the time slot.

Referring back to block 610, in at least some embodiments consistent with the present invention, each peer exchanges, periodically, the video chunk availability information with any other peers with which it communicates.

Referring back to block 620, in at least some embodiments consistent with the present invention, the estimated active chunk set is a system-wide estimate. In at least some other embodiments consistent with the present invention, the estimated active chunk set is an estimate across the peer, and the peers with which it communicates. In yet some other embodiments consistent with the present invention, the estimated active chunk set is an estimate across the peer, the peers with which it communicates, and peers with which those peers communicate thereby defining a subset of peers including the peer and peers within two hops of the peer.

Figure 7:
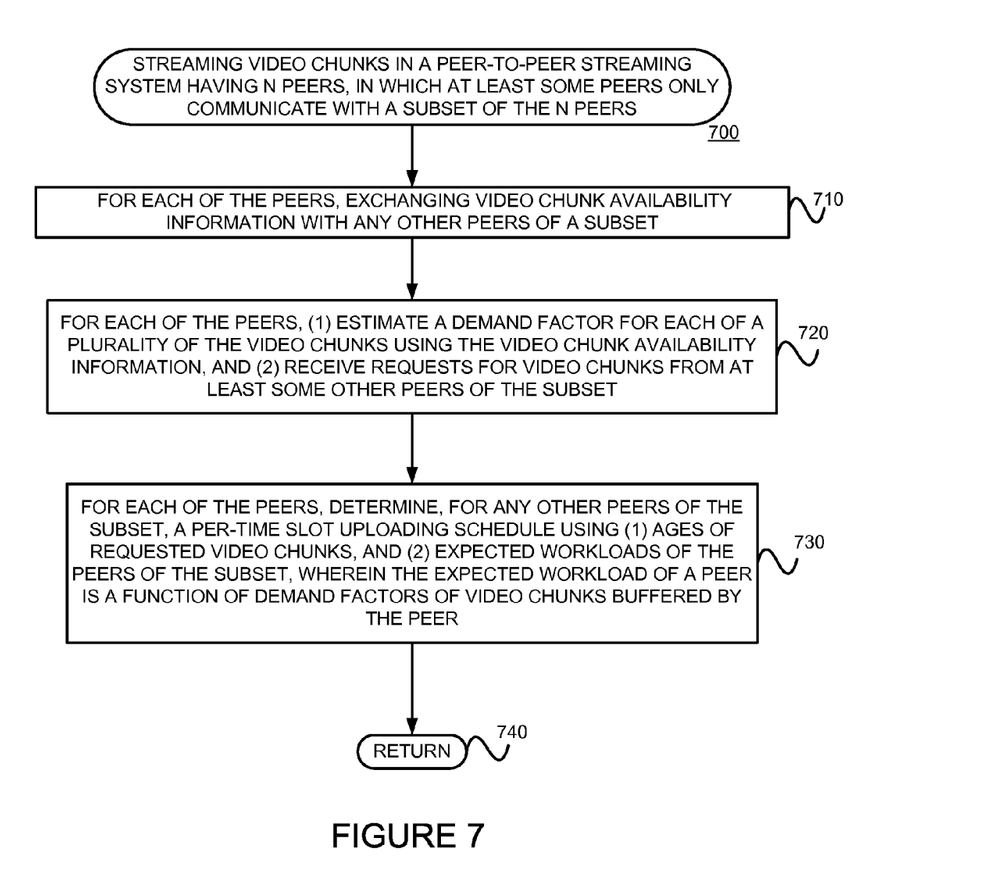
FIG. 7 is a flow diagram of another exemplary method 700 for streaming video chunks in a peer-to-peer streaming system having N peers, in which at least some peers only communicate with a subset of the N peers (e.g., neighboring peers).

FIG. 7 is a flow diagram of another exemplary method 700 for streaming video chunks in a peer-to-peer streaming system having N peers, in which at least some peers exchange information with a subset of the N peers (e.g., neighboring peers, or peers within N hops of the peer). For each of the peers, video chunk availability information is exchanged (e.g., periodically) with any other peers of the subset. (Block 710) For each of the peers, a demand factor for each of a plurality of the video chunks is estimated using the video chunk availability information, and requests for video chunks are received from at least some other peers with which the peer communicates. (Block 720) For each of the peers, a per-time slot uploading schedule for any other peers of the subset is determined using (1) ages of requested video chunks, and (2) expected workloads of the peers of the subset (where the expected workload of a peer is a function of demand factors of video chunks buffered by the peer). (Block 740)

Referring back to block 720, in at least some embodiments consistent with the present invention, the demand factor for a $k^{th}$ video chunk, $d_k$ is the ratio of the number of peers of the subset without chunk k to the number of peers of the subset with chunk k.

Referring back to block 730, in at least some embodiments consistent with the present invention, the total expected workload for peer i is $$W_i = \sum_{k \in B_i} d_k,$$

where $d_k$ is the demand factor for the $k^{th}$ video chunk and wherein B is a set of video chunks buffered by the peer that have not yet been sent to all peers of the subset.

As can be appreciated from the foregoing, in a distributed dynamic scheduling method consistent with the present invention, peers may periodically exchange video chunk availability information with their neighbors, and send requests to neighbors to download missing video chunks. Each peer uses the video chunk availability information from a subset of peers to estimate the system-wide active video chunk set A and the demand factor for each chunk. Each peer locally estimates the expected workloads for peers of the subset. Then, each peer may determine its uploading schedules round by round as follows:

1. Let C be the number of video chunks that the peer can upload in each round.
2. Let REQ be the set of chunk download requests that it receives from its neighbors.
3. Find video chunk j with the lowest ID in REQ set (that is, find the oldest requested video chunk).
4. Let $X_j$ be the number of peers of the subset (e.g., neighbor peers) requesting for j.

5a. If $X_j \geq C$, the peer chooses C peers of the subset with the lowest expected workload to upload chunk j, and the schedule for the round is done.

5b. If $X_j < C$, the peer schedules to upload chunk j to $X_j$ peers in this round, removes all requests for chunk j from REQ set, sets $C = C - X_j$, and goes back to step 3.

A peer may generate requests for the oldest (earliest chunk in streamed sequence) video chunk needed and may send a request the peer, of the subset of peers, with lowest workload. More generally, a peer may send requests for video chunks as a function of at least one of (i) age of the video chunk, and (ii) peer workload.

Figure 8:
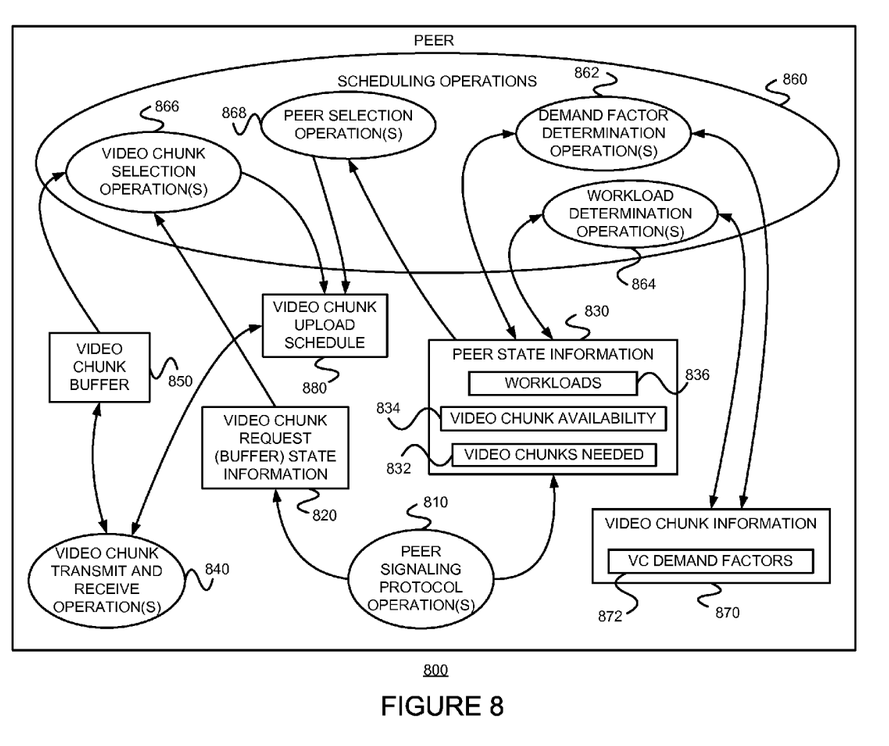
FIG. 8 is a bubble diagram showing operations that may be performed, and information that may be used and/or generated, by a peer performing distributed video chunk transmission (upload) scheduling operations consistent with the present invention.

FIG. 8 is a bubble diagram showing operations that may be performed, and information that may be used and/or generated, by a peer 800 performing distributed scheduling operations consistent with the present invention. The peer 800 includes, among other things, peer signaling protocol operation(s) 810, video chunk request state information 820, peer state information 830, video chunk transmit and receive operation(s) 840, video chunk buffer 850, scheduling operations (860), including demand factor determination operation(s) 862, workload determination operation(s) 864, video chunk selection operation(s) 866 and peer selection operation(s) 868, video chunk information 870, and video chunk upload schedule 880. Peer signaling protocol operation(s) 810 may be used to gather and disseminate peer state information, some of which is stored as video chunk request state information 820 and peer state information 830 (such as video chunks needed by various peers 832 and video chunks available for transmission by various peers 834). Demand factor determination operation(s) 862 may use video chunk information 870 and peer state information 830 to determine demand factors for video chunks, which may be stored as video chunk demand factor information 872. Workload determination operation(s) 864 may use peer state information 830 (and perhaps video chunk information) to determine workloads 836 of the peers. Video chunk selection operation(s) 866 may use video chunk request state information 820 information in the video chunk buffer 850 to determine a preferred video chunk (e.g., the oldest requested video chunk that it has available) to upload in a next time period. Scheduling operations 560 may use both video chunk information (e.g., to find the video chunk(s) with the highest demand factor(s)) and the workload information 836 (e.g., to find the peer with the lowest workload that has requested the preferred video chunk) to generate a video chunk upload schedule 880. The video chunk transmit and receive operation(s) 840 may use this schedule 880 to determine which video chunk(s) 850 to transmit (upload) to which peer(s) in a given time slot.

§4.3 Exemplary Apparatus

Figure 9:
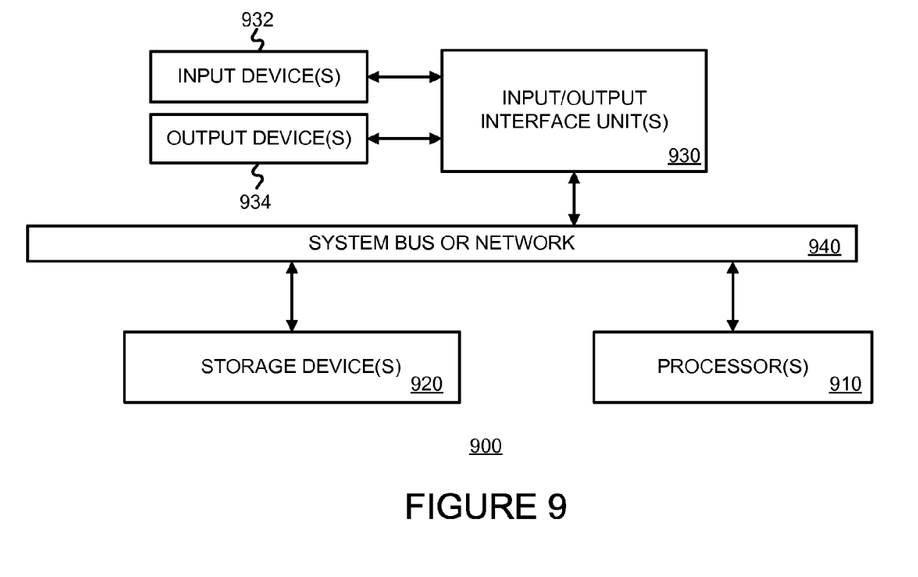
FIG. 9 is a block diagram of exemplary apparatus that may be used to perform operations in a manner consistent with the present invention and/or to store information in a manner consistent with the present invention.

FIG. 9 is a block diagram of exemplary apparatus that may be used to perform operations in a manner consistent with the present invention and/or to store information in a manner consistent with the present invention. The apparatus 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. For example, one or more software modules, when executed by a processor, may be used to perform one or more of the operations and/or methods of FIGS. 2-8. At least a portion of the machine executable instructions may be stored (temporarily or more permanently) on the one or more storage devices 920 and/or may be received from an external source via one or more input interface units 930.

In one embodiment, the machine 900 may be one or more conventional personal computers or servers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

The operations of schedulers, servers, and/or peers, such as those described above, may be performed on one or more computers. Such computers may communicate with each other via one or more networks, such as the Internet for example. Referring back to FIGS. 5 and 8 for example, the various operations and information may be embodied by one or more machines 910. The schedulers, servers, and/or peers can be employed in nodes such as desktop computers, laptop computers, personal digital assistants, mobile telephones, other mobile devices, servers, etc. They can even be employed in nodes that might not have a video display screen, such as routers, modems, set top boxes, etc.

Alternatively, or in addition, the various operations and acts described above may be implemented in hardware (e.g., integrated circuits, application specific integrated circuits (ASICs), field programmable gate or logic arrays (FPGAs), etc.).

§4.4 Refinements, Alternatives and Extensions

Although embodiments described above were discussed with respect to streamed video chunks, other embodiments consistent with the present invention can be used with other streamed information, such as streamed audio for example.

Although some of the exemplary distributed scheduling methods used workloads of peers, simply using workloads is most effective in scenarios where peers have the same (or similar) upload capacity (or offered upload capacity). In at least some embodiments consistent with the present invention, offered upload capacity of a peer can be considered along with its workload (e.g., as a ratio of workload/offered upload capacity), instead of workload alone.

Although some of the embodiments described operations occurring in time slots, these time slots need not correspond to time slots for transmitting a video chunk between peers (although they may). Thus, time slots may be simply considered rounds of operations in at least some embodiments consistent with the present invention.

§4.5 Conclusions

As can be appreciated from the foregoing, embodiments consistent with the present invention can provide P2P video streaming in which peers experience lower streaming delays.

What is claimed is:

1. A method for scheduling the streaming of data chunks in a peer-to-peer streaming system having N peers, the method comprising, for each time slot:
 a) determining whether data chunk transmissions scheduled in previous time slots will have finished at the start of the current time slot;
 b) for each data chunk which will have finished transmission,
  1) indicating that the source peer of the transmission is idle for the current time slot, and
  2) indicating the data chunk which will have finished transmission as belonging to a buffered data chunk set of the destination peer of the transmission;
 c) determining a demand factor $d_k$ for a data chunk k that has been generated by the data source server, but has not been scheduled for uploading to all peers, wherein demand factor $d_k$ is proportional to a number of the N peers which will be without the data chunk k, and is inversely proportional to a number of the N peers which will have the data chunk;
 d) determining an expected workload for each peer to upload data chunks to peers without them using a sum of demand factors for any data chunks that the peer is buffering;
 e) for each of the data chunks that will not have been received by all of the N peers and starting with the oldest of these data chunks,
  1) determining an idle peer with a lowest expected workload per offered upload capacity factor that has the data chunk;
  2) defining the determined idle peer with the lowest expected workload per offered upload capacity factor that has the data chunk as a source peer for the data chunk,
  3) determining a peer that does not yet have the data chunk, that does not have a scheduled delivery of the data chunk, and a lowest expected workload per offered upload capacity factor,
  4) defining the determined peer that does not yet have the data chunk, that does not have a scheduled delivery of the data chunk, and a lowest expected workload per offered upload capacity factor as a destination peer for the data chunk,
  5) scheduling having the source peer transmit the data chunk to the destination peer during the time slot by marking the source peer as being busy and marking the destination peer with a scheduled delivery of the data chunk, and
  6) repeating (e)(1)-(e)(5) while there are peers missing the data chunk, until no source peer destination peer pair for the data chunk can be determined.

2. The method of claim 1 wherein the demand factor $d_k$ is a ratio of the number of peers without data chunk k to the number of peers with data chunk k.

3. The method of claim 1 wherein the total expected workload for peer i is $$W_i = \sum_{k \in B_i} d_k,$$

where $d_k$ is the demand factor and wherein B is a set of data chunks buffered by the peer that have not yet been sent to all of the N peers.

4. The method of claim 1 further comprising repeating the method until each of the peers is scheduled to receive each of the data chunks of the data stream.

5. The method of claim 1 further comprising:
 f) transmitting the data chunks in accordance with the scheduling.

6. The method of claim 1 further comprising:
 f) signaling the scheduling to the N peers; and
 g) transmitting the data chunks in accordance with the scheduling.

7. The method of claim 1 wherein the offered upload capacity factor is set to a fixed value for all peers.

8. A method for streaming data chunks in a peer-to-peer streaming system having N peers, in which at least some peers only exchange data with a subset of the N peers, the method comprising:
 a) for each of the peers, exchanging data chunk availability information with any other peers of the subset;
 b) for each of the peers,
  (1) estimating an active data chunk set, using the data chunk availability information, defining data chunks not yet received by at least one peer of the subset of peers,
  (2) estimating a demand factor for each data chunk of the active data chunk set using the data chunk availability information, wherein demand factor for a given data chunk K is proportional to a number of the subset of peers which will be without the given data chunk K, and is inversely proportional to a number of the subset of peers which will have the given data chunk K,
  (3) estimating, for any other peers of the subset, an expected workload of the peer using a sum of demand factors for any data chunks that the other peer is buffering,
  (4) sending at least one request for a data chunk to at least one peer of the subset, and
  (5) receiving at least one request for a data chunk from at least one peer of the subset; and
 c) for each of the peers, determining, for any other peers of the subset, a per-time slot uploading schedule by
  1) determining, from among the data chunks for which it has received an unfilled request, the oldest data chunk belonging to the active data chunk set,
  2) determining, from among peers that have sent the peer a request for the determined oldest data chunk, a peer with a lowest expected workload per offered upload capacity factor, and
  3) scheduling sending at least the determined oldest data chunk to at least the determined peer with the lowest expected workload per offered upload capacity factor.

9. The method of claim 8 further comprising:
 d) sending the scheduled at least the determined oldest data chunk to at least the determined peer with the lowest expected workload per offered upload capacity factor.

10. The method of claim 8 wherein for each of the peers, the act of determining, for any other peers of the subset, a per-time slot uploading schedule includes     determining a number C of data chunks that the peer can transmit in one time slot,     determining, from among the data chunks for which it has received an unfilled request, the oldest data chunk belonging to the active data chunk set,     determining a number X of peers that have sent the peer a request for the determined oldest data chunk     if the determined number X of peers that have sent the peer a request for the determined oldest data chunk is greater than the determined number C of data chunks that the peer can transmit in one time slot, then         determining, from among peers that have sent the peer a request for the determined oldest data chunk, a number C of peers with a lowest expected workload per offered upload capacity factor, and         sending the determined oldest data chunk to the determined number C of peers with the lowest expected workload per offered upload capacity factor,     otherwise,         sending the determined oldest data chunk to all of the peers that have sent the peer a request for the determined oldest data chunk, and         if X<C sending at least one other data chunk to at least one other peer using the age of the data chunk and the workload per offered upload capacity factors of the peers of the subset, otherwise, not sending any further data chunks in the time slot.

11. The method of claim 8 wherein each peer exchanges, periodically, the data chunk availability information with any other peers of the subset.

12. The method of claim 8 wherein the estimated active data chunk set is a system-wide estimate.

13. The method of claim 8 wherein the estimated active data chunk set is an estimate across the peer, and the peers of the subset.

14. The method of claim 8 wherein the estimated active data chunk set is an estimate across the peer, the peers with which it communicates, and peers with which those peers communicate thereby defining a set of peers including the peer and peers within two hops of the peer.

15. The method of claim 8 wherein the offered upload capacity factor is set to a fixed value for all peers.

16. A method for streaming data chunks in a peer-to-peer streaming system having N peers, in which at least some peers only exchange information with a subset of the N peers the method comprising:

a) for each of the peers, exchanging data chunk availability information with any other peers of a subset of peers;

b) for each of the peers,

(1) estimating a demand factor for each of a plurality of the data chunks using the data chunk availability information, and         (2) receiving requests for data chunks from at least some other peers of the subset; and     c) for each of the peers of the subset, determining, for any other peers of the subset, a per-time slot uploading schedule using (1) ages of requested data chunks, and (2) expected workloads of the peers of the subset,         wherein the expected workload of a peer is a function of demand factors of data chunks buffered by the peer.

17. The method of claim 16 wherein the demand factor for a $k^{th}$ data chunk, $d_k$ is the ratio of the number of peers of the subset without data chunk k to the number of peers of the subset with data chunk k.

18. The method of claim 16 wherein the total expected workload for peer i is $$W_i = \sum_{k \in B_i} d_k,$$

where $d_k$ is the demand factor for the $k^{th}$ data chunk and wherein B is a set of data chunks buffered by the peer that have not yet been sent to all peers of the subset.

19. The method of claim 16 wherein the act of determining a per-time slot uploading schedule further uses an offered upload capacity factor for each of the peers.

\* \* \* \* \*